2,715,126
Patented Aug. 9, 1955

2,715,126

PRODUCTION OF 4-AMINO-3-SULFO-1,8-NAPHTHALIMIDES

John F. Mulvaney, Berkeley Heights, and Marvin O. Shrader, Westfield, N. J., assignors to General Aniline & Film Corporation, New York, N. Y., a corporation of Delaware No Drawing. Application June 20, 1951,
Serial No. 232,664

5 Claims. (Cl. 260—281)

The present invention relates to the preparation of greenish-yellow wool dyestuffs by the sulfonation of 4-amino-1,8-naphthalimides.

Wool and silk dyestuffs of the 4-amino-1,8-naphthalimide sulfonic acid class are particularly valuable by reason of their brilliant greenish-yellow shades. The most important dyestuffs of this class are those in which the sulfonic acid group is in the 3 position, i. e. ortho to the amino group in the naphthalene nucleus.

These dyestuffs have been prepared according to Eckert United States Patent No. 1,796,012, granted March 10, 1931, by reacting a 4-nitro-1,8-naphthalimide with aqueous sodium hydrosulfite to effect simultaneous reduction of the nitro group, and ortho-sulfonation of the naphthalene ring. This method, however, is objectionable for the reason that the product obtained is purified only with difficulty and at great expense.

Another method of preparation has been reported in BIOS 959. This method provides for the sulfonation of 4-amino-1,8-naphthalic anhydride by means of oleum and purification of the intermediate by time-consuming sulfuric acid fractionation. The final dyestuff is prepared from the so-obtained intermediate by condensation with the selected amine in water.

A similar method is described in United States Patent No. 2,455,095, granted to Scalera et al. on November 30, 1948. The Scalera method differs from the German method in providing for the introduction of two sulfonic acid groups into the naphthalene nucleus instead of a single group.

We have now discovered that dyestuffs of this class can be formed in high yields of excellent quality, while avoiding the disadvantages of the prior procedures by reacting a 4-amino-1,8-naphthalimide with chlorosulfonic acid in the presence of an inert solvent serving as a diluent for the reaction. Such method constitutes the purposes and objects of the present invention.

The 4-amino-1,8-naphthalimides which we propose to sulfonate may be represented by the following structural formula:

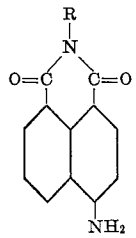

in which R is an aliphatic radical such as alkyl, i. e. methyl, ethyl, propyl, butyl, isobutyl, amyl, hexyl, octyl, isooctyl, decyl, dodecyl and the like; hydroxyalkyl such as hydroxymethyl, hydroxyethyl and the like; carboxyalkyl such as carboxymethyl, carboxyethyl and the like; cycloalkyl such as cyclopentyl, cyclohexyl and the like; aralkyl such as benzyl and the like; or an aromatic radical such as aryl, i. e. phenyl, toluyl, naphthyl and the like; carboxyaryl, i. e. carboxyphenyl, carboxynaphthyl and the like; alkoxyaryl such as anisyl and the like; hydroxyaryl such as salicyl and the like.

These compounds are for the most part known compounds, as may be seen from a reference to Eckert United States Patent No. 1,836,529, granted December 15, 1931.

In any case the compounds may be prepared as described in the application of Marvin O. Shrader, Serial No. 714,149, filed December 5, 1946, entitled "4-Acylamino-1,8-Naphthalimides and their Preparation."

As previously stated, the sulfonation is carried out in the presence of an inert solvent. For this purpose we have used o-dichlorobenzene, toluene, kerosene and the like. Any solvent inert to the reactants and which is liquid at the temperatures ranging from 20 to 130° C. may be successfully employed.

The method may be effectively performed by dissolving the selected 4-amino-1,8-naphthalimide in the desired inert solvent and then adding the chlorosulfonic acid to the resulting solution portionwise while cooling the reaction mixture. The temperatures at which the mixture is held during the portionwise addition of the chlorosulfonic acid may range from 20 to 40° C.

After all of the acid has been added the temperature is raised by heating to about 95 to 125° C. and maintained at this temperature for several hours. The reaction mixture is then drowned in water and worked up to the desired 3-sulfonic acid by steam distilling to remove the solvent, filtering the solution and salting out the dyestuff with an inorganic salt such as sodium sulfite, potassium chloride and the like.

The invention is further illustrated by the following examples, although it is to be understood that the invention is not restricted thereto.

Example 1

30.2 parts of N-p-tolyl-4-amino-1,8-naphthalimide are added to 350 parts of o-dichlorobenzene. 60 parts of the dichlorobenzene are distilled off under vacuum in order to dry the mixture.

The mixture is cooled to 30 to 40° C. and 15.5 parts of chlorosulfonic acid are added dropwise thereto. After all the acid has been added, the mixture is heated to 100 to 105° C. and held at this temperature for 15 hours. The sulfonation mixture is then drowned in 1000 parts of water containing 20 parts of carbon black. The mixture is subjected to steam distillation to remove the dichlorobenzene and filtered hot. The dyestuff is salted out of the filtrate by means of potassium chloride, and is identical to that prepared by the simultaneous sulfonation and reduction of N-tolyl-4-nitro-1,8-naphthalimide with sodium bisulfite.

Example 2

26.8 parts of N-n-butyl-4-amino-1,8-naphthalimide are added to 310 parts of o-dichlorobenzene. 55 parts of the dichlorobenzene are distilled off under vacuum. The mixture is cooled to 25 to 30° C. and 13.7 parts of chlorosulfonic acid are added dropwise thereto. After the addition of the acid, the temperature of the mixture is raised by heating to 105 to 110° C. and held at this temperature for about 14 hours. The sulfonation mixture is then drowned in water and worked up as in Example 1. The product is identical to that produced by the simultaneous sulfonation and reduction of N-n-butyl-4-nitro-1,8-naphthalimide with sodium bisulfite.

It is known that by subjecting aromatic amines to the action of sulfuric acid in the presence of an inert diluent ortho sulfonic acids are produced. However, this solvent baking process requires temperatures materially in excess of 100° C. in order to remove the water formed as a by-product in the reaction. Furthermore, most products, when sulfonated by the sulfuric acid method, generate oily or tarry products and cause considerable mechanical difficulties.

By effecting the sulfonation, however, while utilizing chlorosulfonic acid, as provided for above, temperatures as low as 95 to 125° can be employed, while avoiding the mechanical difficulties inherent in the use of sulfuric acid. Furthermore, the by-product of the sulfonation, to wit, hydrogen chloride, is eliminated as anhydrous hydrochloric acid. In addition, little or no tarring occurs.

A further surprising fact about the use of chlorosulfonic acid is that the sulfonation takes place almost selectively in the naphthalene nucleus, even when the imino nitrogen is substituted by a relatively simple aromatic radical.

To sum up, it may be said that our process offers the following particular advantages over the prior procedures:
1. Higher yields of the desired dyestuff are obtained;
2. The dyestuff is more easily separated from impurities;
3. Expensive purification of intermediates is eliminated.

Various modifications of the invention will occur to persons skilled in the art. Thus it is evident that any of the naphthalimides listed may be effectively substituted for those appearing the the specific examples, without modifying the sulfonation process. We, therefore, do not intend to be limited in the patent granted, except as necessitated by the appended claims.

We claim:
1. Process for the production of 4-amino-3-sulfo-1,8-naphthalimides by sulfonation of 4-amino-1,8-naphthalimides in which the imide nitrogen is substituted by a radical selected from the class consisting of alkyl, cycloalkyl, aralkyl and aryl radicals which comprises subjecting such naphthalimide in the presence of a normally liquid inert solvent to the action of chlorosulfonic acid at a temperature ranging from 95 to 125° C.

2. The process as defined in claim 1 wherein the inert solvent is o-dichlorobenzene.

3. The process as defined in claim 1 wherein the sulfonated product is worked up by steam distillation in the presence of an activated adsorbing agent, filtering and salting out the sulfonated product from the filtrate.

4. A process for the production of 4-amino-3-sulfo-1,8-naphthalimides comprising mixing a 4-amino-1,8-naphthalimide in which the imide nitrogen is substituted by a radical selected from the class consisting of alkyl, cycloalkyl, aralkyl and aryl radicals with chlorosulfonic acid in the presence of a normally liquid inert solvent at a temperature ranging from about 20 to 40° C. and then heating the mixture at a temperature ranging from about 95 to 125° C.

5. The process of claim 4 in which the inert solvent is o-dichlorobenzene.

References Cited in the file of this patent

UNITED STATES PATENTS

| | | |
|---|---|---|
| 1,776,971 | Hailwood | Sept. 30, 1930 |
| 1,796,011 | Eckert | Mar. 10, 1931 |
| 1,796,012 | Eckert | Mar. 10, 1931 |
| 2,445,095 | Scalera et al. | Nov. 30, 1948 |

OTHER REFERENCES

Suter: "The Organic Chemistry of Sulfur" (John Wiley, New York; 1944), pp. 196, 200, 245, and 291.